Figure 1:
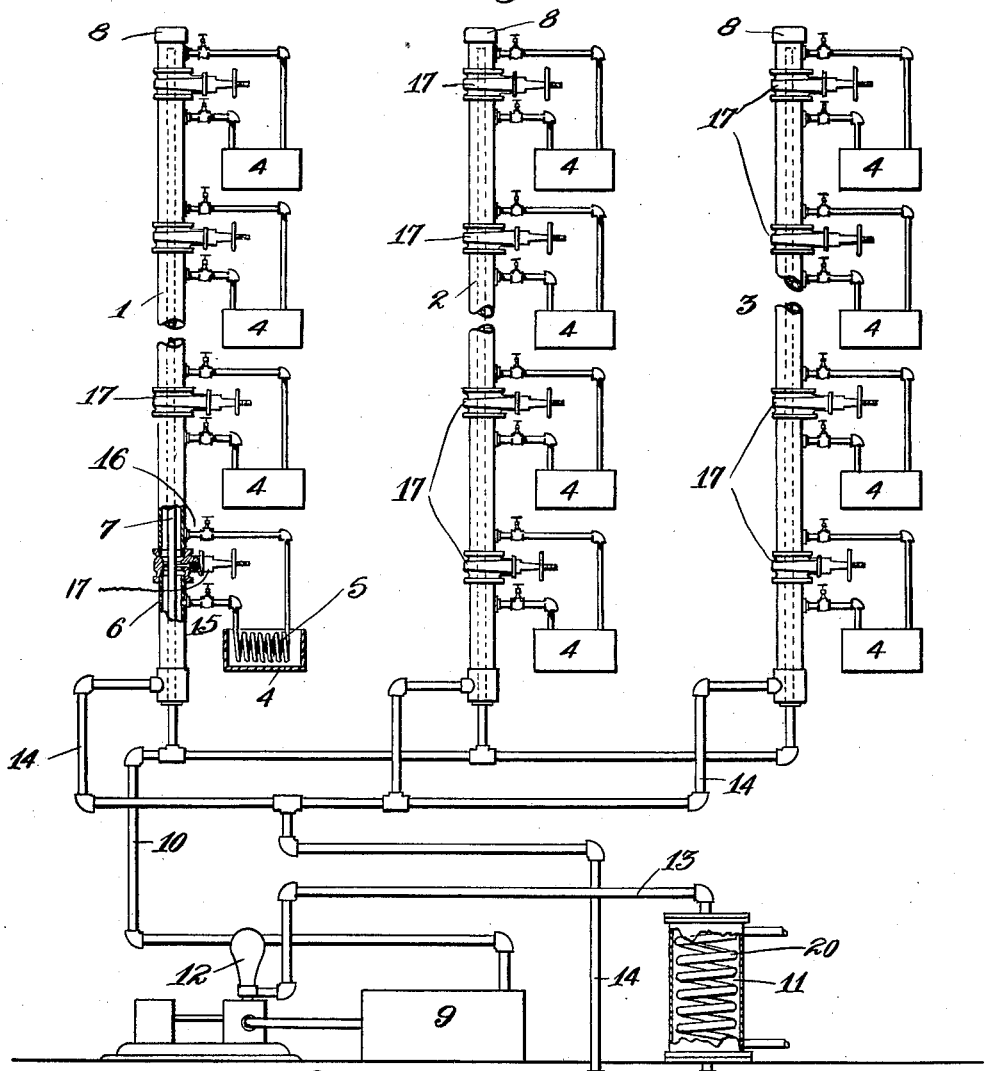

No. 895,700. PATENTED AUG. 11, 1908.
H. TORRANCE, Jr.
REFRIGERATING SYSTEM.
APPLICATION FILED JUNE 14, 1907.

Attest:

by

Inventor:
Henry Torrance Jr
Attys

UNITED STATES PATENT OFFICE.

HENRY TORRANCE, JR., OF NEW YORK, N. Y.

REFRIGERATING SYSTEM.

No. 895,700.

Specification of Letters Patent.

Patented Aug. 11, 1908.

Application filed June 14, 1907. Serial No. 379,077.

*To all whom it may concern:*

Be it known that I, HENRY TORRANCE, Jr., a citizen of the United States, residing at New York, in the county of New York and State of New York, have invented certain new and useful Improvements in Refrigerating Systems; and I do hereby declare the following to be a full, clear, and exact description of the same, such as will enable others skilled in the art to which it appertains to make and use the same.

My invention relates to improvements in refrigerating systems and particularly to systems wherein a considerable number of relatively small cooling boxes or the like are served from one common refrigerating apparatus.

My invention is particularly applicable to apartment houses, hotels and the like, the several apartments or suites of which it is desirable to provide with refrigerators operated from common refrigerating apparatus. In such installations there will commonly be refrigerators to be served on a number of different floors and the system will comprise one or more risers each serving a series of refrigerators or cooling boxes.

My invention consists in a novel arrangement of piping and valves, whereby the piping is arranged very compactly, and whereby the cost of insulating the piping against the entrance of heat is greatly reduced. My invention relates particularly to refrigeration systems of the type wherein refrigeration is effected by cooling brine or equivalent liquid and circulating the cold brine through cooling coils. Such systems require an outgoing pipe line and a return pipe line. According to my invention these two pipe lines are arranged annularly or one within the other, the outgoing line being preferably outside the return line, as this arrangement facilitates the connections to the cooling coils. Each such cooling coil (refrigerator) has two connections at different levels to the outgoing line and between these two connections I provide means, preferably a suitable valve, for throttling the flow through the outgoing line between these two points, so producing a difference of pressure which causes a portion of the cold brine to flow through the cooling coil as a by-pass.

In systems of this kind, for example in installations in large apartment houses, it is commonly desirable to have one comparatively large central cooling plant serving a great many small cooling boxes, each with a few feet of comparatively small coils. In such a system it is desirable that the body of circulating brine shall be comparatively large and that large circulating pipes be used, so that the body of brine in its progress from and back to the central cooling plant shall not change much in temperature so that boxes tapping the circulating system at one point shall receive brine about as cold as those tapping it at another. But in such a system the friction or resistance to flow of the brine through the comparatively large circulating pipes is of course very small, except as constrictions are introduced as in this system, while the resistance in the small coiled pipes of the individual cooling boxes is greater. The present invention provides in such large circulating pipes a resistance to flow, preferably adjustable, so that circulation in the individual boxes is assured, such balancing resistance being inserted in the main conduit between the points where the inlet and the outlet of such an individual box tap the same.

The objects of my invention are to improve and simplify refrigerating apparatus of the class described, to arrange the pipe lines thereof more compactly, to reduce the cost of heat insulation of such lines, and to provide for efficient regulation of the flow of brine through the different cooling coils of the system, so that the refrigerating effect may be distributed as desired between the different cooling coils. Since, as stated, it is commonly the purpose to have so large a body of brine and circulate it at such speed that there is no great difference in temperature in the body at different points in the system, the outgoing and return mains can be conveniently made concentric. By such an arrangement, one layer or sheath of heat-insulation does for both mains.

I will now proceed to describe my invention with reference to the accompanying drawings, illustrating diagrammatically one embodiment thereof, and will then point out the novel features in claims.

Figure 2:
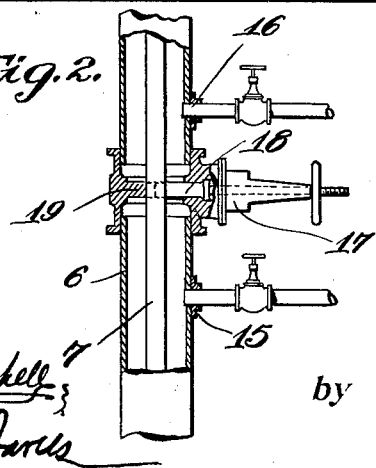
Figure 3:
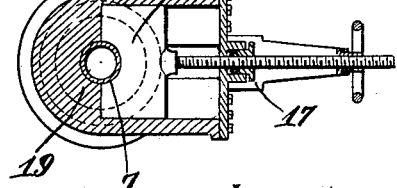

In said drawings: Figure 1 shows diagrammatically a refrigerating system such as described, comprising three risers serving independent series of cooling boxes; Fig. 2 is a detail view on a larger scale of a portion of one of said risers, the outer pipe of which and the throttle valve, are shown in section; and Fig. 3 shows a horizontal section through one of the throttle valves.

In said drawings, 1, 2 and 3 are risers each serving a series of refrigerating boxes 4. I have only illustrated these boxes 4 diagrammatically, showing one sectioned to show a cooling coil 5 therein. It is to be supposed that the other boxes are provided with similar coils. Each riser comprises an outgoing pipe 6 and a return pipe 7 arranged annularly with the return pipe inside the outgoing pipe. Said outgoing pipe is closed at the top by a cap 8, the return pipe, however, being open at the top so that the cooling liquid may flow to the top of pipe 6 and then downward through pipe 7. 9 designates a brine storage tank to which the return cooling fluid is delivered by a pipe 10 connected to all of the return pipes 7. 11 designates a brine cooling tank to which the brine is delivered from tank 9 by means of a pump 12 and pipe 13, and 14 is a pipe for conveying the cooled brine from tank 11 to the several outgoing pipes 6 of the different risers.

The cooling coil of each box 4 has two connections to the outgoing line 6, namely, a supply connection 15 and a return connection 16, each provided with a suitable regulating and shut off valve; and to create a difference of pressure between these two connections 15 and 16 I provide a throttling valve 17 between each such two points, whereby a pressure differential between such points over and above that due to difference in head and friction of the pipes, may be created. I have found it practicable to pass the return pipe 7 directly through these valves 17 by using for valves 17 ordinary gate valves the movable gates of which move across only one half of the annular space between pipes 6 and 7, the other half of such space being permanently closed. This is illustrated particularly in Figs. 2 and 3, wherein 18 designates the said movable gate adapted to close half the annular space between the pipes 6 and 7 and 19 designates a fixed rib permanently closing the other half of such space. As will be understood, it is not necessary that these valves 17 be absolutely tight, since they are not intended to shut off the flow absolutely but merely to create a small regulable pressure differential between the points of connection of their corresponding cooling boxes to the outgoing line; hence the form of valve shown is entirely suitable for the purpose.

In the brine cooling tank 11 there is a customary coil 20 or equivalent device for circulating ammonia gas or other suitable refrigerating agent derived from a refrigerating machine not shown, to cool the brine.

As will be obvious from the foregoing description, in the operation of my apparatus brine is pumped from brine tank 9 through cooling tank 11 to the supply pipes 6 of the various risers and in passing up through said pipes 6 a portion of the stream leaves such pipes 6 at the connection 15 of every cooling box the valves of which are open, circulates through the cooling coil 5 of that box and returned to the outgoing line 6 through connection 16, such portion of the stream passing through the cooling coil of the box as a by-pass or shunt around throttling valve 17. At the top of each pipe 6 the brine passes into pipe 7 and returns thence through pipe 10 to tank 9. As a comparatively large volume of cold brine is desired in the mains, such mains are commonly larger than the necessities of the flow demand and the rib does not interfere with the normal flow while it coöperates with 18 in creating the balancing resistance desirable between inlets and outlets of individual coolers.

What I claim is:—

1. A refrigerating system comprising a conduit having outgoing and return lines arranged one within the other, means for circulating cooling fluid through said supply line to the mouth of the return line and thence back, cooling coils each having a supply and a return connection to such outgoing line, and means in such outgoing line between each such two points of connection creating a pressure differential between such points.

2. A refrigerating system comprising a conduit having outgoing and return lines arranged one within the other, means for circulating cooling fluid through said supply line to the mouth of the return line and thence back, cooling coils each having a supply and a return connection to the outer of said lines, and flow-restricting means between each such two points of connection.

3. A refrigerating system comprising a conduit having outgoing and return lines, the latter located within the former, means for circulating cooling fluid through said supply line to the mouth of the return line and thence back, cooling coils each having a supply and a return connection to the outer line, and a valve in the outer line between each such two points of connection and through which valve the inner line passes, for creating a pressure differential between such points of connection.

4. A refrigerating system comprising a conduit having outgoing and return lines, the latter located within the former, means for circulating cooling fluid through said supply line to the mouth of the return line and thence back, cooling coils each having a supply and a return connection to the outer line and a gate valve in the outer line between each such two points of the connection, said gate valve having a gate adapted to restrict a portion of the annular space between the outgoing and return lines.

5. A refrigerating system comprising a conduit having outgoing and return lines, the latter located within the former, means for circulating cooling fluid through said supply line to the mouth of the return line and thence back, cooling coils each having a supply and a return connection to the outer line and a gate valve in the outer line between each such two points of the connection, said gate valve having a gate adapted to restrict a portion of the annular space between the outgoing and return lines and having a fixed portion restricting another portion of such annular space.

In testimony whereof I affix my signature, in the presence of two witnesses.

HENRY TORRANCE, Jr.

Witnesses:
K. G. LEARD,
H. M. MARBLE.